US012527552B2

(12) United States Patent
Rouet et al.

(10) Patent No.: US 12,527,552 B2
(45) Date of Patent: Jan. 20, 2026

(54) METHOD AND SYSTEM FOR IMPROVED ULTRASOUND PLANE ACQUISITION

(71) Applicant: KONINKLIJKE PHILIPS N.V., Eindhoven (NL)

(72) Inventors: Laurence Germond Rouet, Paris (FR); Cybele Ciofolo-Veit, Meudon (FR); Caroline Denise Francoise Raynaud, Suresnes (FR); Antoine Olivier, Suresnes (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 533 days.

(21) Appl. No.: 17/786,072

(22) PCT Filed: Dec. 7, 2020

(86) PCT No.: PCT/EP2020/084853
§ 371 (c)(1),
(2) Date: Jun. 16, 2022

(87) PCT Pub. No.: WO2021/122098
PCT Pub. Date: Jun. 24, 2021

(65) Prior Publication Data
US 2023/0036897 A1 Feb. 2, 2023

(30) Foreign Application Priority Data
Dec. 17, 2019 (EP) .................................... 19290118

(51) Int. Cl.
*A61B 8/00* (2006.01)
*A61B 8/08* (2006.01)
(Continued)

(52) U.S. Cl.
CPC .............. *A61B 8/523* (2013.01); *A61B 8/085* (2013.01); *A61B 8/0866* (2013.01); *A61B 8/42* (2013.01);
(Continued)

(58) Field of Classification Search
None
See application file for complete search history.

(56) References Cited

U.S. PATENT DOCUMENTS

2009/0074280 A1   3/2009   Lu et al.
2015/0250455 A1   9/2015   Lee et al.
(Continued)

FOREIGN PATENT DOCUMENTS

WO   2014162232 A1   10/2014
WO   2018042008 A1   3/2018
(Continued)

OTHER PUBLICATIONS

International Search Report and Written Opinion for PCT/EP2020/084853, Mailing date: Mar. 3, 2021, 11 Pages.
(Continued)

*Primary Examiner* — Shahdeep Mohammed

(57) ABSTRACT

The invention provides a method for determining a global confidence index for a 2D ultrasound image extracted from a 3D ultrasound volume, wherein the global confidence index indicates the suitability of the 2D ultrasound image for medical measurements. The method comprises obtaining a 3D ultrasound volume of a subject and extracting a set of at least one 2D ultrasound image from the 3D ultrasound volume. A set of geometrical indicators are then obtained with a first neural network, wherein each geometrical indicator indicates geometrical features of the anatomy of the subject. The set of 2D ultrasound images are then processed with a second neural network, wherein the output of the
(Continued)

second neural network is a set of anatomical indicators and wherein the anatomical indicators indicate at least the presence of anatomical landmarks. A global confidence index is then determined for each one of the set of 2D ultrasound images based on the geometrical indicators and the anatomical indicators.

15 Claims, 7 Drawing Sheets

(51) Int. Cl.
    *G06N 3/045*     (2023.01)
    *G06N 3/08*     (2023.01)

(52) U.S. Cl.
    CPC .............. *A61B 8/463* (2013.01); *A61B 8/466* (2013.01); *A61B 8/469* (2013.01); *A61B 8/483* (2013.01); *A61B 8/5223* (2013.01); *G06N 3/045* (2023.01); *G06N 3/08* (2013.01)

(56) References Cited

U.S. PATENT DOCUMENTS

| | | | |
|---|---|---|---|
| 2016/0081663 A1* | 3/2016 | Chen | G06T 7/62 |
| | | | 600/407 |
| 2016/0328998 A1 | 11/2016 | Pedersen et al. | |
| 2018/0108139 A1 | 4/2018 | Abramoff et al. | |
| 2020/0027237 A1* | 1/2020 | Baumgartner | G06T 7/73 |
| 2020/0323516 A1* | 10/2020 | El Kaffas | A61B 8/463 |
| 2021/0204914 A1* | 7/2021 | Meral | G06N 3/044 |

FOREIGN PATENT DOCUMENTS

| | | |
|---|---|---|
| WO | 2018060723 A1 | 4/2018 |
| WO | 2018172236 A1 | 9/2018 |
| WO | 2019190968 A1 | 10/2019 |
| WO | 2019201726 A1 | 10/2019 |

OTHER PUBLICATIONS

Yang, X. et al., "Agent With Warm Start and Adaptive Dynamic Termination for Plane Localization in 3D Ultrasound," IEEE Transactions on Medical Imaging, 2021, vol. 40, No. 7, pp. 1950-1961.

Lorenz, C. et al., "Automated abdominal plane and circumference estimation in 3D US for fetal screening", Progress in Biomedical Optics and Imaging, SPI, Abstract Only.

Pesteie M. et al., "Automatic Localization of the Needle Target for Ultrasound-Guided Epidural Injections," IEEE Transactions on Medical Imaging, 2018, vol. 37, No. 1, pp. 81-92.

Abuhamad A., "Automated multiplanar imaging: a novel approach to ultrasonography", J Ultrasound Med., 2004, vol. 23, No. 5, pp. 573-576.

Sofka, M. et al., "Automatic Detection and Measurement of Structures in Fetal Head Ultrasound Volumes Using Sequential Estimation and Integrated Detection Network (IDN)", IEEE Transactions on Medical Imaging, 2014, vol. 33, No. 5, pp. 1054-1070.

* cited by examiner

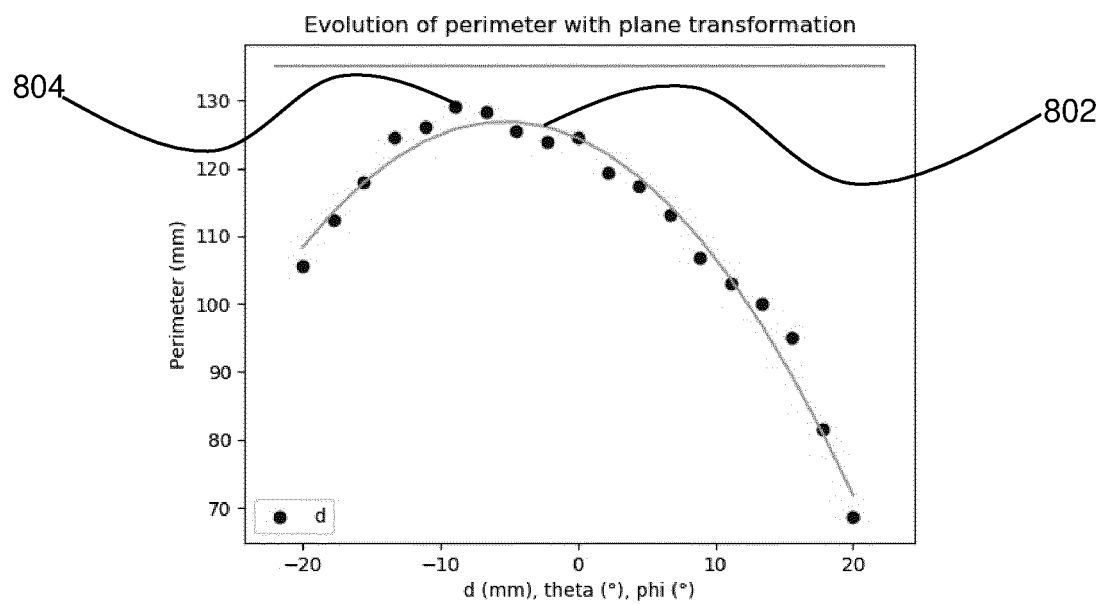
FIG. 8
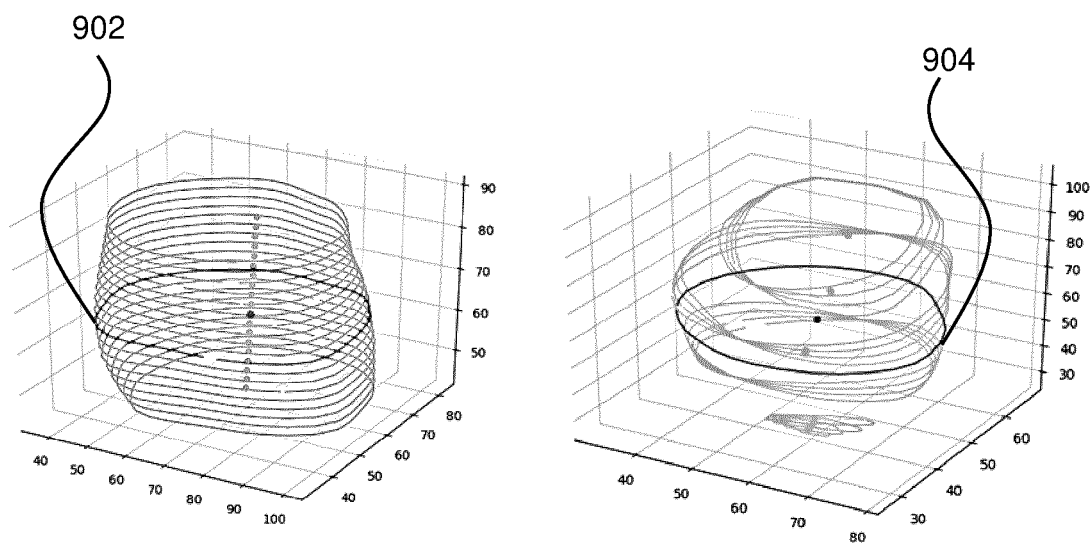
FIG. 9A
FIG. 9B

METHOD AND SYSTEM FOR IMPROVED ULTRASOUND PLANE ACQUISITION

CROSS-REFERENCE TO PRIOR APPLICATIONS

This application is the U.S. National Phase application under 35 U.S.C. § 371 of International Application No. PCT/EP2020/084853, filed on Dec. 7, 2020, which claims the benefit of European Patent Application No. 19290118, filed on Dec. 17, 2019. These applications are hereby incorporated by reference herein.

FIELD OF THE INVENTION

The invention relates to methods and systems for obtaining a global confidence index which indicates the suitability of ultrasound image for biometrical measurements. The invention further relates to enabling a less skilled user to perform biometrical measurements from an ultrasound volume with use of the global confidence index.

BACKGROUND OF THE INVENTION

Ultrasound imaging techniques have transformed ultrasound imaging into a powerful diagnostic tool as such techniques provide a powerful visualization tool of the anatomy of a subject under investigation at a fraction of the cost of other diagnostic tools such as MRI.

Ultrasonic imaging is routinely used during pregnancy to assess the development of a fetus in the mother's womb and measure the anatomy of the fetus, known as fetal biometry. The traditional way for a clinician to acquire an image of each required view of the fetus is to manipulate an ultrasound probe while in acoustic contact with the abdomen of the mother until a desired anatomical orientation is in the plane of the 2D imaging probe. If multiple views are to be generated with such a procedure, there is a high risk of non-optimal measurements because obtaining and analyzing these views requires high skill (in particular fetal echocardiography is very operator-dependent) whilst in addition the fetus may be moving during the procedure, requiring the clinician to reorient himself or herself with the fetus each time the fetus moves.

Of particular interest to analyze the development of the fetus are so-called biometry measurements, which are used to check if the fetus is developing correctly, e.g. within expected tolerances. Such biometry measurements typically rely on anatomical criteria defined in international guidelines to facilitate the biometry measurements. However, the provision of such measurements is a time-consuming exercise, as it requires detection and labelling of anatomical features such as bones and joints in the body of the fetus in order to provide target landmarks. Labelling can be difficult due to the ultrasound fetus images being impaired by well-known artefacts, scattering and shadowing effects that result from its location in the mother's womb. Thus, fetal biometry requires highly skilled people to acquire suitable planes in order to perform the biometry measurements.

Ultrasound imaging may also be used, for example, to assess the liver of a subject. Optimal planes for the liver have to be acquired by searching for the hepatic veins in the imaging plane, which requires a highly skilled clinician to perform such measurements.

US 2009/0074280 discloses a system for determining a plane position within a 3D ultrasound data for a volume, in order to obtain a standard view. The use of standard views improves consistency between users. The 3D volume is analyzed using volumetric features, Haar wavelet features and gradient features.

US 2016/081663 discloses a method for imaging a subject. Candidate structures are identified in each of a plurality of 3D image frames. A subgroup of image frames including the target structure is identified from the 3D frames. For that subgroup of 3D image frames, plurality of 2D scan planes is determined, and ranked using a determined ranking function to identify a desired scan plane.

There is a need for an improved method which enables less expert or non-expert users to perform standard biometry measurements.

SUMMARY OF THE INVENTION

The invention is defined by the claims.

According to examples in accordance with an aspect of the invention, there is provided a method for determining a global confidence index for a two-dimensional, 2D, ultrasound image extracted from a three dimensional, 3D, ultrasound volume, wherein the global confidence index comprises a measure of the suitability of the 2D ultrasound image for biometry measurements, the method comprising:

obtaining a 3D ultrasound volume of a subject;

extracting a set of at least one 2D ultrasound image from the 3D ultrasound volume;

obtaining a set of geometrical indicators with a first neural network, wherein each geometrical indicator indicates geometrical features of the anatomy of the subject;

processing the set of 2D ultrasound images with a second neural network, wherein the output of the second neural network is a set of anatomical indicators and wherein the anatomical indicators indicate at least the presence of anatomical landmarks; and determining a global confidence index for each one of the set of 2D ultrasound images based on the geometrical indicators and the anatomical indicators.

The method provides a global confidence index for 2D ultrasound images to a clinician based on a 3D ultrasound volume. First, a set of 2D ultrasound images are extracted from a 3D ultrasound volume. In order to obtain the global confidence index, a set of geometrical indicators and a set of anatomical indicators must first be determined.

In fetal biometry, the geometrical indicators may indicate the circumference, biparietal diameter and/or occipitofrontal diameter of either the head or of the abdomen, depending on the anatomy of the 2D ultrasound image (whether the image is of the head or the abdomen). The abdominal circumference is typically used in combination with the head circumference and femur length to determine the weight and age of a fetus. If the 2D ultrasound image is of the femur, the geometrical indicator may indicate the length of the femur. The set of geometrical indicators may also include the cephalic index and/or the ratio between the femur length and abdominal circumference during fetal biometry, as these are well known measurements which may indicate the health of a fetus.

In order to determine the anatomical indicators, the 2D ultrasound images are input into a second neural network, wherein the second neural network has been trained to identify a set of anatomical landmarks. For example, in an ultrasound image of the abdomen of a fetus, the second neural network may be trained to identify the stomach, the ribs, the spine, the umbilical vein and the left portal vein. These anatomical landmarks are typically used by experts in fetal biometry to identify a suitable ultrasound image plane for measuring the abdominal circumference.

The second neural network is configured to output a set of anatomical indicators. For example, it is well known that an optimal plane to measure the head circumference during fetal biometry is the transthalamic plane. In the transthalamic plane, the thalami and the cavum septum pellucidi are anatomical landmarks which can be seen. The second neural network can be trained to identify these anatomical landmarks, wherein the anatomical indicator indicates at least the presence of the anatomical landmarks in a 2D ultrasound image.

Accurate and reliable medical measurements of the head circumference, abdomen circumference and femur length in fetal biometry are important to determine the age, weight, size and health of a fetus. The global confidence index may indicate whether a 2D ultrasound image is a suitable plane to perform the medical measurements of, for example, the head circumference, abdominal circumference and the femur length of a fetus. The global confidence index for example enables the most suitable image from a set of 2D ultrasound images to be selected. It may also enable a user to determine or estimate how close a 2D ultrasound image is to being an optimal plane for the biometry measurements. Both the geometrical indicators and the anatomical indicators are used to determine the global confidence index. The global confidence index may aid a clinician to determine which 2D ultrasound image to use when measuring the head circumference in fetal biometry, where the clinician only has to obtain a 3D ultrasound volume and thus does not need to be an expert in fetal biometry.

The first neural network may be a 2D neural network and obtaining a set of geometrical indicators may comprise processing the set of 2D ultrasound images with the 2D neural network, wherein the output of the 2D neural network is the set of geometrical indicators.

In this method for determining the set of geometrical indicators, the 2D ultrasound images are input into a first 2D neural network, where the first 2D neural network has been trained to segment and indicate geometrical features, such as the head, the abdomen and/or the femur. The output may be, for example, a perimeter or area of the segmented anatomy.

Alternatively, the first neural network may be a 3D neural network and wherein obtaining a set of geometrical indicators comprises processing the 3D ultrasound volume with the 3D neural network, wherein the 3D neural network is trained to identify 3D anatomical structures inside the 3D ultrasound volume and the output of the 3D neural network is the set of geometrical indicators.

In this method, the 3D ultrasound volume is input into a first 3D neural network. The first 3D neural network is trained to identify anatomical structures (e.g. ribs, liver, stomach etc.) inside the 3D volume. The geometrical indicator may then be based on various 2D planes intersecting the anatomical structures and measuring, for example, the size, length or width of the anatomical structures.

The first 3D neural network can be used for anatomical segmentation (e.g. stomach, ribs etc.) in 3D. This allows a set of 2D planes which intercept the 3D anatomical segments to be obtained, and thus the 2D ultrasound images based on the 2D planes, and any 2D planes which do not intercept the 3D anatomical segments can be ignored.

A geometrical indicator may be dependent on one or more of the other geometrical indicators.

The geometrical indicators obtained from the 3D neural network may be computed at the interception of 3D anatomical structures with the set of 2D ultrasound images.

The method may further comprise displaying a sub set of 2D ultrasound images and displaying the corresponding global confidence index with each one of the 2D ultrasound images from the sub set of 2D ultrasound images, wherein the sub set of 2D ultrasound images is determined based on comparing the corresponding global confidence index of the 2D ultrasound images by selecting the 2D ultrasound images:

with the highest values of the global confidence index for the 2D ultrasound images in the set; or with the lowest values of the global confidence index for the 2D ultrasound images in the set; or meeting a pre-determined value of the global confidence index; or meeting a user-determined value of the global confidence index.

Thus, a value of the global confidence index may represent good suitability, or a low value of the global confidence index may represent good suitability. The relative values of the global confidence index between the 2D ultrasound images may be used to select a sub-set, or else an absolute value (which may be user-defined) may be used as a threshold against which the 2D ultrasound images are compared.

Displaying a sub set of 2D ultrasound images which correspond to a certain range and/or values of global confidence index may help a clinician learn what the most suitable plane for a 2D ultrasound image is. For example, three 2D ultrasound images may be displayed, with one of the images being at the plane determined to be most suitable and the other images being at a plane which has been translated either side of the most suitable plane. This can help a clinician learn when they are near to the optimal plane for the biometry measurements.

The invention also provides a method for selecting a 2D ultrasound image during fetal biometry, the method comprising:

determining a global confidence index using the method defined above, wherein the 3D ultrasound volume is a fetal biometry 3D ultrasound volume;

displaying a 2D render of the 3D ultrasound volume;

displaying a virtual ultrasound probe, wherein the virtual ultrasound probe is configured to virtually navigate in three dimensions around the 3D ultrasound volume according to a fetal biometry workflow;

selecting a 2D ultrasound image from the set of 2D ultrasound images based on the position of the virtual ultrasound probe with respect to the 3D ultrasound volume and further with a global confidence index corresponding to a highest level of suitability.

The method for selecting the 2D ultrasound image may further comprise, for the selected 2D ultrasound image with a selected plane:

rotating the virtual ultrasound probe around an axis perpendicular to the selected plane normal, and passing through the selected plane center, and wherein selecting the 2D ultrasound image is further based on the rotation of the virtual ultrasound probe around the perpendicular axis; and translating the virtual ultrasound probe along an axis parallel to the selected plane normal and wherein selecting the 2D ultrasound image is further based on the translation of the virtual ultrasound probe along the parallel axis.

A method for simulating a plane extraction during fetal biometry helps an inexperienced clinician navigate a real ultrasound probe to a suitable position to obtain an ultrasound image. The 3D volume of the fetus and a virtual ultrasound probe may be displayed on a display. The virtual ultrasound probe can then automatically navigate virtually around the 3D volume of the fetus and show the clinician which 2D ultrasound image would be obtained from placing a real ultrasound probe in certain positions. A global confidence index for each 2D ultrasound image can also be displayed to show which ultrasound images are most suitable for the biometry measurements.

The method for selecting an 2D ultrasound image may further comprise:
displaying the selected 2D ultrasound image;
displaying the corresponding global confidence index; and
displaying the virtual ultrasound probe on the 3D ultrasound volume in a position which indicates where a real ultrasound probe would be placed on a real 3D volume to obtain the selected 2D ultrasound image.

The invention also provides a computer program comprising code means for implementing the method as mentioned above when said program is run on a processing system.

The invention also provides a system for determining a global confidence index for a two-dimensional, 2D, ultrasound image extracted from a three dimensional, 3D, ultrasound volume, wherein the global confidence comprises a measure of the suitability of the 2D ultrasound image for medical measurements, the system comprising:
an ultrasound probe for obtaining a 3D ultrasound volume of a subject;
a processor configured to:
extract a set of at least one 2D ultrasound images from the 3D ultrasound volume;
compute a set of geometrical indicators with a first neural network, wherein each geometrical indicator indicates geometrical features of the anatomy of the subject;
process the set of 2D ultrasound images with a second neural network, wherein the output of the second neural network is a set of anatomical indicators and wherein the anatomical indicators indicate at least the presence of anatomical landmarks; and
determine a global confidence index for each one of the set of 2D ultrasound images based on the geometrical indicator and the anatomical index.

The system may further comprise a display for displaying one or more of:
a global confidence index; and
at least one 2D ultrasound image.

The invention also provides a system for selecting a 2D ultrasound image during fetal biometry, comprising:
the system for determining a global confidence index as defined above, wherein the 3D ultrasound volume is a fetal biometry 3D ultrasound volume and wherein the processor is further configured to:
select a 2D ultrasound image from the set of 2D ultrasound images based on the position of the virtual ultrasound probe with respect to the 3D ultrasound volume and further with a global confidence index (114) corresponding to a highest level of suitability;
and wherein the display is further configured to:
display a 2D render of the 3D ultrasound volume;
displaying a virtual ultrasound probe, wherein the virtual ultrasound probe is configured to virtually navigate in three dimensions around the 3D ultrasound volume according to a fetal biometry workflow; and
display the selected 2D ultrasound image and the corresponding global confidence index.

The processor may be further configured, for the selected 2D ultrasound image with a selected plane, to:
rotate the virtual ultrasound probe around an axis perpendicular to the selected plane normal, and passing through the selected plane center;
translate the virtual ultrasound probe along an axis parallel to the selected plane normal; and
select a 2D ultrasound image further based on the rotation of the virtual ultrasound probe around the perpendicular axis and the translation of the virtual ultrasound probe along the parallel axis.

The display may be further configured to:
display the virtual ultrasound probe on the 3D ultrasound volume in a position which indicates where a real ultrasound probe would be placed on a real 3D volume to obtain the selected 2D ultrasound image.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:
FIG. 8 shows a first example of abdominal circumference at different virtual probe translations;
FIGS. 9A and 9B show an example of abdominal circumference measurements at different virtual probe translations and rotations.

DETAILED DESCRIPTION OF THE EMBODIMENTS

Figure 1:
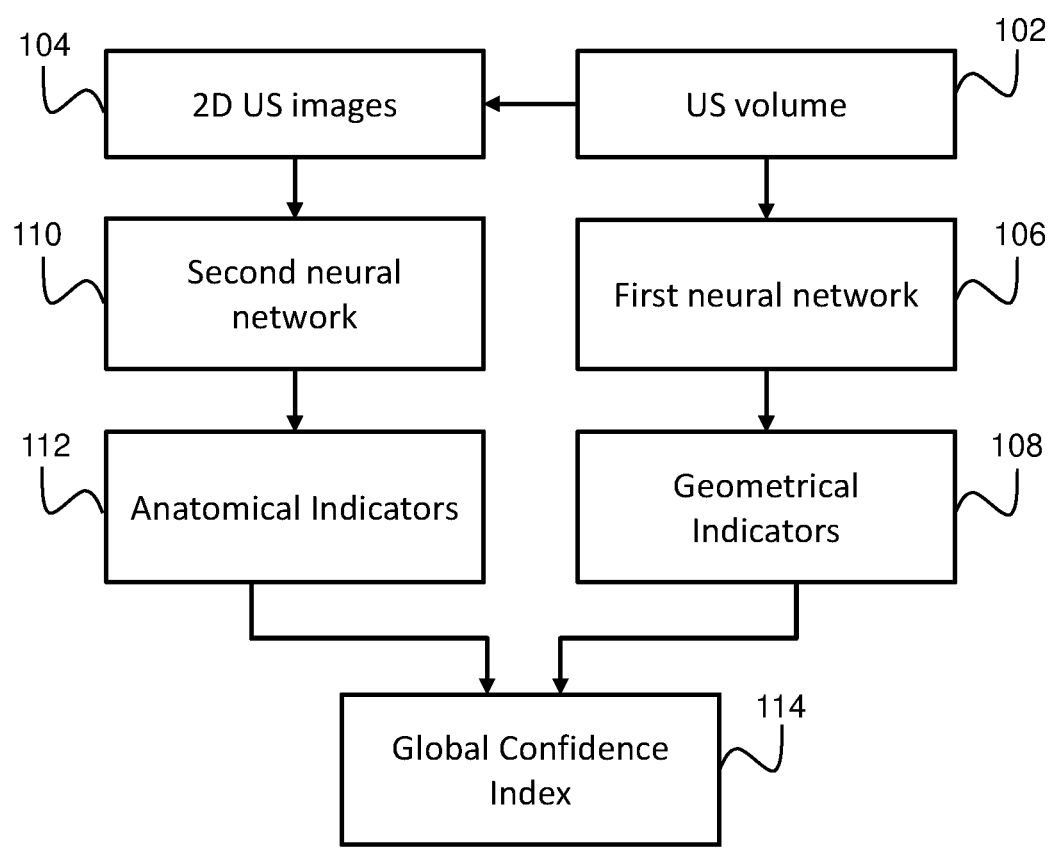
FIG. 1 shows a method for obtaining a global confidence index.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for determining a global confidence index for a 2D ultrasound image extracted from a 3D ultrasound volume, wherein the global confidence index indicates the suitability of the 2D ultrasound image for medical measurements. The method comprises obtaining a 3D ultrasound volume of a subject and extracting a set of at least one 2D ultrasound image from the 3D ultrasound volume. A set of geometrical indicators are then obtained with a first neural network, wherein each geometrical indicator indicates geometrical features of the anatomy of the subject. The set of 2D ultrasound images is then processed with a second neural network, wherein the output of the second neural network is a set of anatomical indicators and wherein the anatomical indicators indicate at least the presence of anatomical landmarks. A global confidence index is then determined for each one of the set of 2D ultrasound images based on the geometrical indicators and the anatomical indicators.

FIG. 1 shows a method for obtaining a global confidence index 114. The principle is to ask the user to acquire a 3D ultrasound volume 102 that contains the target anatomy and extract 2D ultrasound images 104 from the 3D volume 102. There is no requirement for a specific alignment of the central slice of the volume on the corresponding 2D standard plane for the given anatomy. Using the acquired volume 102, a first step is to measure the geometry of the target anatomy (geometrical indicator). The ultrasound data is input into a first neural network 106 wherein the first neural network 106 is trained to measure the geometry of the target anatomy (e.g. the circumference of liver, length of femur etc.) and output a set of geometrical indicators 108.

In parallel, a second neural network 110 is run in order to provide an assessment of the validity of each extracted plane and output a set of anatomical indicators 112. By combining the measurements of the geometrical indicators 108 and the anatomical indicators 112, a global confidence index 114 is derived. A global confidence index 114 is provided for each two-dimensional (2D) ultrasound image.

In the example of FIG. 1, the geometrical indicators are derived from the 3D volume 102 whereas the anatomical indicators are derived from the 2D images 104. This is just one example, as will become clear from the further examples below.

The global confidence index 114 may be used to propose a most suitable target plane to the user. The target plane may be displayed together with the corresponding global confidence index 114. Additional displays may allow to evaluate the respective global confidence indexes 114 of planes in the vicinity of the target plane.

Therefore, the global confidence index 114 can be used to aid an inexperienced clinician in acquiring a suitable plane for 2D ultrasound measurements which is most similar to an optimal plane (e.g. transthalamic plane for head circumference biometry). For example, it may be used during fetal biometry to acquire planes for the measurement of the head, abdomen and femur. In another example, it may be used to acquire most suitable 2D ultrasound planes for the hepatic veins when imaging the liver of a subject Finding a global confidence index 114 comprises the use of (multiple) neural networks to perform 3D organ segmentation or 2D biometry segmentation, and 2D anatomical frame scoring and derive a score for each frame. The global confidence index 114 can then be used in live usage to guide a clinician (e.g. inexperienced clinician) to obtain an suitable ultrasound plane/image for biometry measurements.

Figure 2:
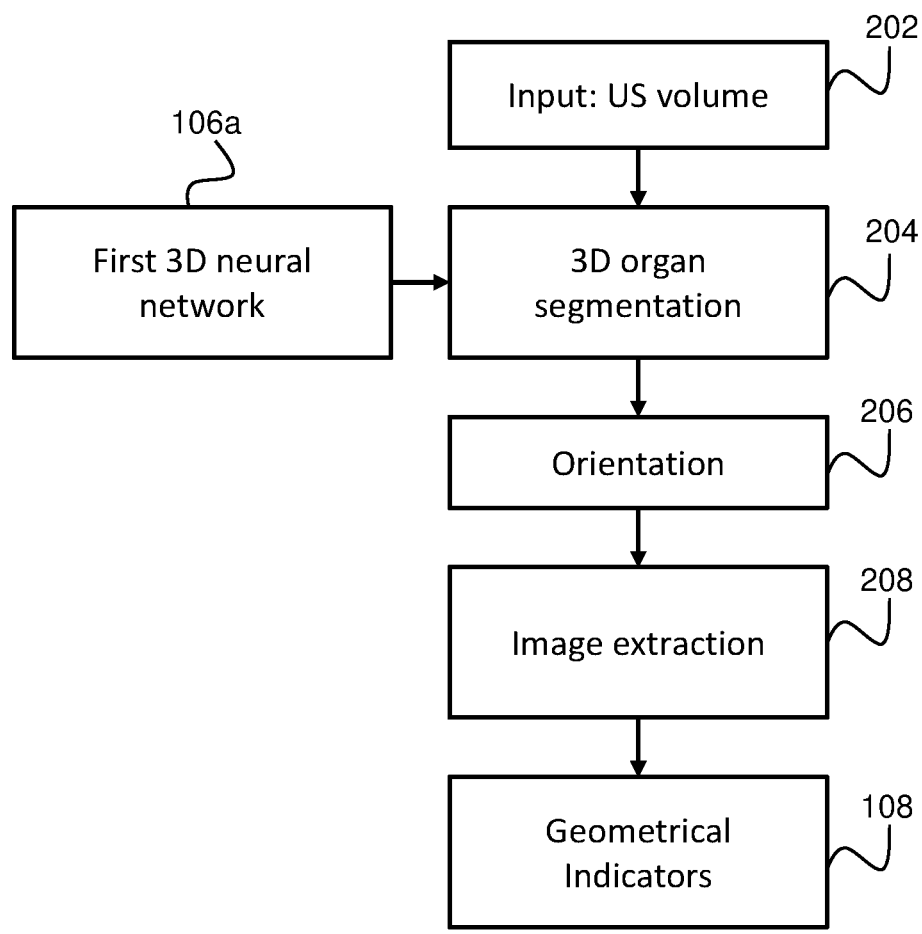
FIG. 2 shows a method for using a first 3D neural network.

FIG. 2 shows a method for using a first 3D neural network 106a. Given the 3D ultrasound volume, step 202, the anatomy is segmented directly in 3D, step 204, with a first 3D neural network 106a. Additional processing may be performed to extract the main long axis of the structure, step 206, (for example a direction parallel to the spine in abdominal imaging) and 2D ultrasound planes are then extracted from planes which intersect the 3D volume, step 208. The geometrical indicators 108 are then determined from the intersection between the 3D segmentation and each 2D ultrasound plane. The geometrical indicators 108 of each 2D plane may depend on the geometrical indicators 108 of the other 2D ultrasound planes.

A display may be used to display the extraction of 2D ultrasound images. For example, a virtual 2D probe may be displayed in order to simulate multiple positions of an equivalent 2D probe that would image a section of the volume. For each 2D image, a measurement of the target anatomy is then computed by using the previously obtained 3D segmentation, taking the intersection of the plane and the volume.

Figure 3:
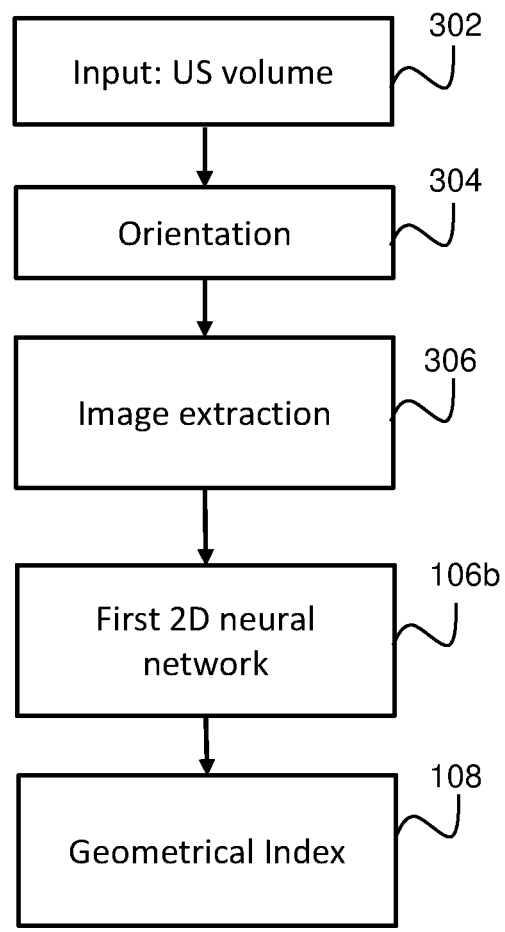
FIG. 3 shows a method for using a first 2D neural network.

FIG. 3 shows a method for using an alternative first 2D neural network 106b. If no 3D segmentation network 106a is available, a first 2D neural network 106b may be used, for example, as a 2D segmentation network. After the 3D ultrasound volume has been obtained, step 302, and oriented, step 304, 2D ultrasound images are extracted from the volume in step 306. The 2D ultrasound images are then input into the first 2D neural network 106b and a set of geometrical indicators 108 are given to each of the corresponding 2D ultrasound images.

In the case of using the first 2D neural network 106b, the method for orienting the 3D ultrasound volume may, for example, be based on segmenting the 2D ultrasound images or the 3D ultrasound volume.

In this case, a virtual probe may be directly used to simulate multiple positions and obtain sections of the ultrasound volume. Then, for example, a 2D segmentation network 106b is used on each of the 2D ultrasound images, corresponding to the position of the virtual probe, to segment the corresponding anatomy of each image and perform measurements of the anatomy, thus determining a set of geometrical indicators 108.

Figure 4:
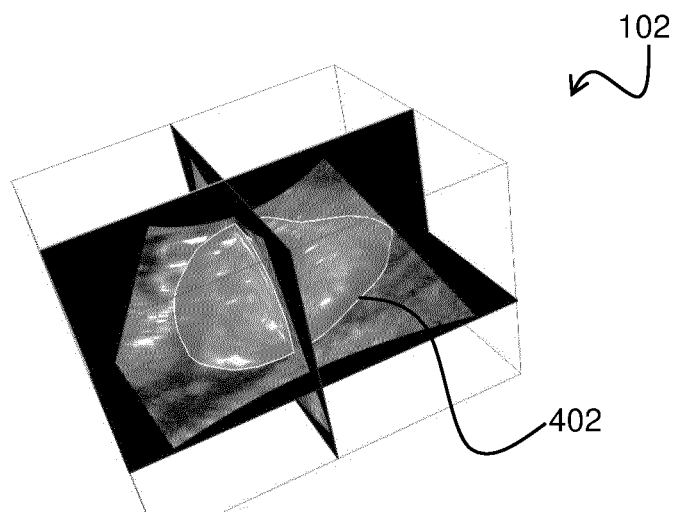
FIG. 4 shows a 3D segmentation performed by a first 3D neural network.

FIG. 4 shows a 3D segmentation 402 performed by a first 3D neural network 106a. Training the first 3D neural network may be done with a learning database made of 3D volumes 102 of a target anatomy associated with ground truth segmentations in 3D. For example, the learning database could be of 3D volumes 102 of a stomach with the corresponding 3D segmentation 402. The 3D neural network is trained to infer 3D segmentations 402 of the corresponding anatomy. The output of the first 3D neural network may be a 3D mesh or mask, expressed in the volume coordinates.

Figure 5:
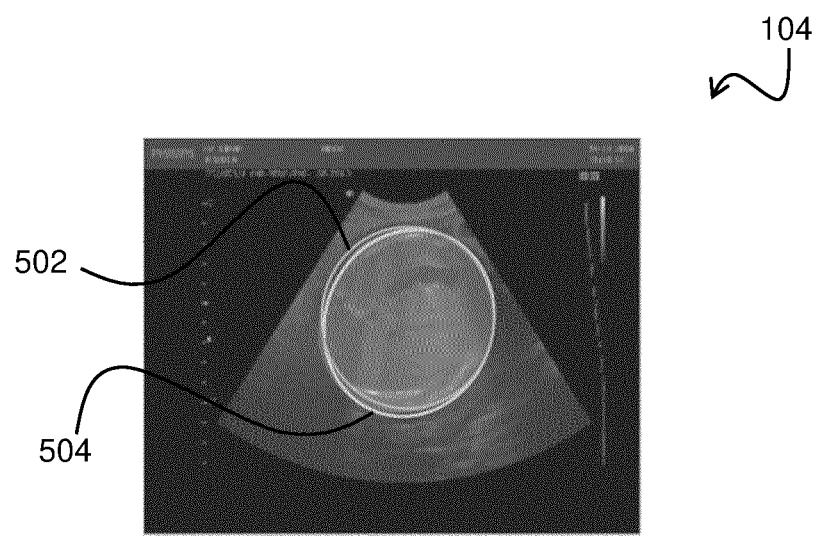
FIG. 5 shows a 2D segmentation performed by a first 2D neural network.

FIG. 5 shows a 2D segmentation 502 performed by a first 2D neural network 106b. Training the first 2D neural network 106b may be done with a database of 2D images 104 containing a given anatomy (abdomen, head etc.). The first 2D neural network 106b is trained to segment the corresponding anatomy and output, for example, a segmented perimeter 502. Following clinical routine, a geometric object 504 (ellipse, circle etc.) can then be fitted to the output of the network in order to provide a measurement of the object.

Figure 6:
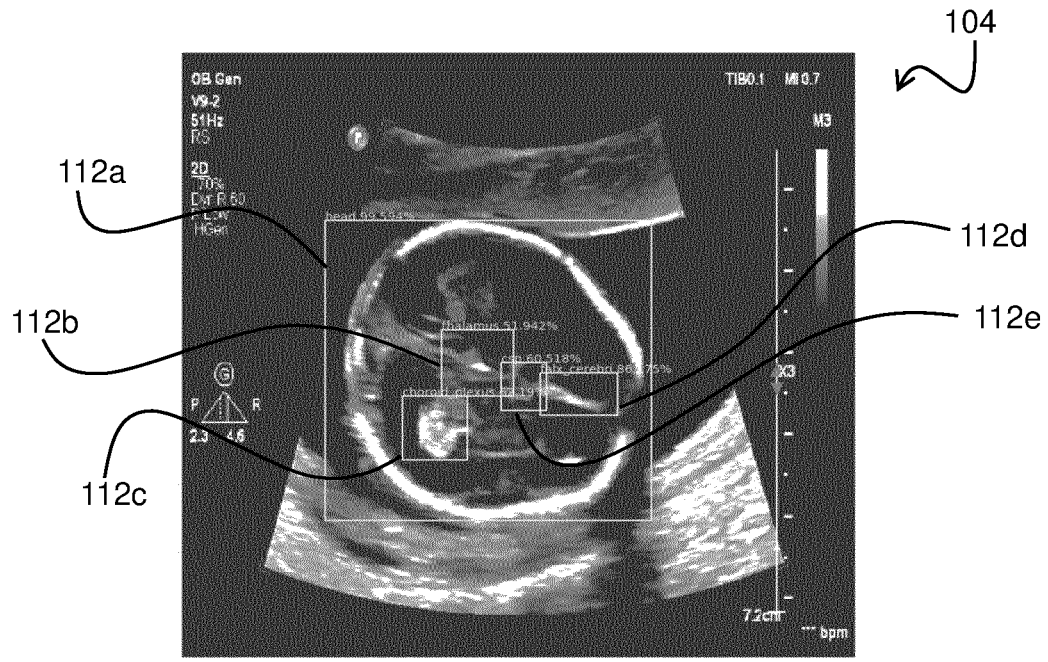
FIG. 6 shows an example of a set of anatomical indicators.

FIG. 6 shows an example of a set of anatomical indicators 112. The anatomical indicators show: the head 112a, the thalamus 112b, the choroid plexus 112c, the falx cerebri 112d and the cavum septum pellucidi 112e in an ultrasound image 104 of the head of a fetus. The second neural network 110 may be trained with a database of 2D images 104 that contain the required anatomies according to clinical guidelines. Each plane may then be associated with a score corresponding to its anatomical content. The output of the second neural network 110 may be, for example, a square surrounding each of the anatomical landmarks and a percentage of how confident the neural network is of the presence of the anatomical landmark.

Figure 7:
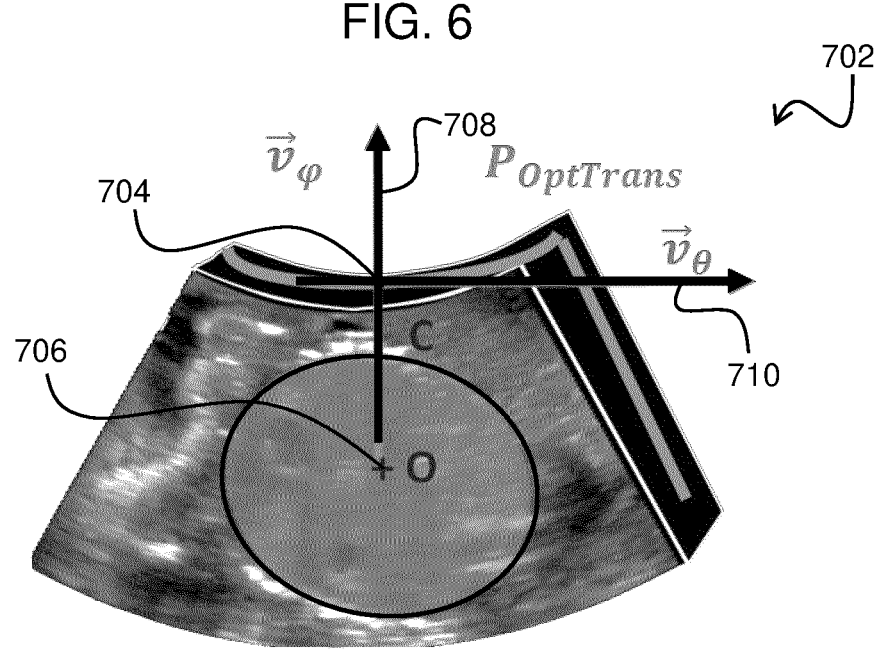
FIG. 7 shows an example of an optimal ultrasound plane.

FIG. 7 shows an example of an optimal ultrasound plane 702. Inspired by a clinical workflow, a virtual probe may navigate virtually in the volume in an organized approach as follows:

First, translations are performed along the detected main axis and planes are extracted at different translation positions. Each plane is then evaluated according to the geometrical indicators 108 and the anatomical indicators 112 using the first neural network 106 and the second neural network 110.

Second, the plane is selected corresponding to the best global confidence index and this plane is denoted as $P_{OptTrans}$ 702. The point C (reference 704) is the point at the intersection of the probe footprint and the plane $P_{OptTrans}$ 702.

The possible rotations are then defined:
(1) From C 704, and the center of the considered 2D frame O 706, the vector $\vec{v}_\varphi$ 708 is the axis of the first rotation.
(2) The cross-product between the normal to $P_{OptTrans}$ 702 and $\vec{v}_\varphi$ 708 defines the second axis of rotation denoted $\vec{v}_\theta$ 710.

For a discrete range of values of angles φ and θ, a rotation of angle φ (around axis $\vec{v}_\varphi$ 708) is performed followed by a rotation of angle θ (around axis $\vec{v}_\theta$ 710) and the corresponding planes are extracted.

For each of the planes extracted, a global confidence index 114 is then determined. The global confidence index 114 for each of the planes is then compared and the plane with the global confidence index 114 indicating greatest suitability for the biometry measurements is then considered to be the target (most optimal available) plane to obtain the 2D ultrasound image. This is because, although the plane $P_{OptTrans}$ 702 may be the most suitable plane during the translations, there may be a better plane at a different angle (φ and/or θ) to $P_{OptTrans}$ 702 to make the required biometry measurements.

The global confidence index which indicates the best suitability may be determined from the the greatest numerical value or the smallest numerical value, depending on the format of the global confidence index.

Out of the planes extracted, a sub set of the 2D ultrasound images may be selected for display together with the corresponding global confidence index. The sub set of 2D ultrasound images is for example determined based on comparing the corresponding global confidence index values of the 2D ultrasound images. A sub set of a desired number of 2D images may be selected with the values of the global confidence index indicating a greatest suitability (this may be the highest or lowest values of the global confidence index as mentioned above). Alternatively, images for display may be based on meeting a pre-determined threshold value of the global confidence index or meeting a user-defined threshold value of the global confidence index.

FIG. 8 shows a first example of abdominal circumference at different virtual probe translations. In an example, $P_{OptTrans}$ 702 corresponds to where the curve 802 reaches its maximum. It is clear that the curve 802 may be fitted to the measured points of the abdominal circumference based on any known curve fitting techniques. Alternatively, $P_{OptTrans}$ 702 may correspond to the point with the highest value 804.

FIGS. 9A and 9B show an example of abdominal circumference measurements at different virtual probe translations and rotations. Abdominal circumference measurements may form part of the set of geometrical indicators 108 in fetal biometry. As described above, the virtual probe is translated along the main axis of the abdomen and performs measurements at different (discrete) positions. The plane with the best geometrical indicator 108 corresponds to the plane with, in this case, the largest circumference 902. FIG. 9A shows cross-sections which represent the translated cross-sections tested for the selection of $P_{OptTrans}$ 702. The circumference 902 may be used to determine a geometrical indicator (in this case, indicating the abdominal circumference).

Once the most suitable plane is found, the different possible rotations are performed. FIG. 9B shows, at fixed $P_{OptTrans}$ 702, the cross-sections representing the combinations of $\vec{v}_\theta$ 710 and $\vec{v}_\varphi$ 708 variations. The best geometrical indicator can thus be derived based on the different circumferences at different rotations. However, the best geometrical indicator may not be related to the best global confidence index, since a plane with a high geometrical indicator may not contain the required anatomical landmarks that are required for the biometry measurements.

In FIG. 9B, the circumference 904 is the largest circumference measured after the rotations are performed. Therefore, instead of using the circumference 902 to determine a geometrical indicator, the circumference 904 can be used to provide a more accurate geometrical indicator for the abdominal circumference.

Figure 10:
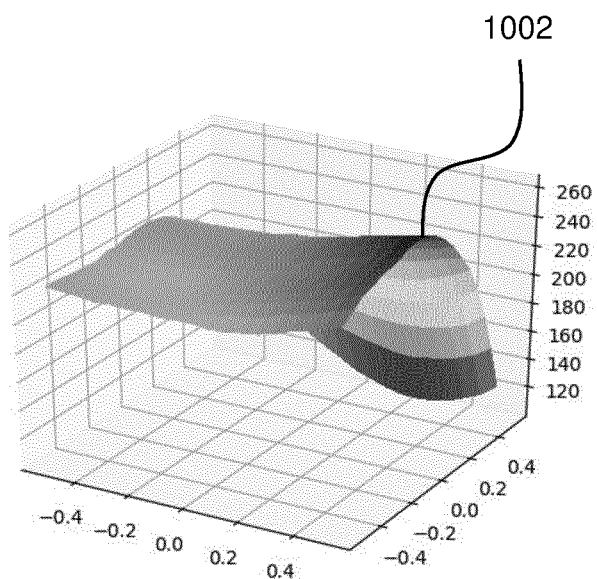
FIG. 10 shows an illustration of geometrical indicators for a set of angle combinations.

FIG. 10 shows an illustration of geometrical indicators for a set of angle combinations. The x and y axis represent different rotations around φ and θ and the z axis represents the geometrical indicator representing the abdominal circumference. The best geometrical indicator value 1002 may then be used, in combination other geometrical indicators 108 and anatomical indicators 112 to calculate a global confidence index 114.

Figure 11:
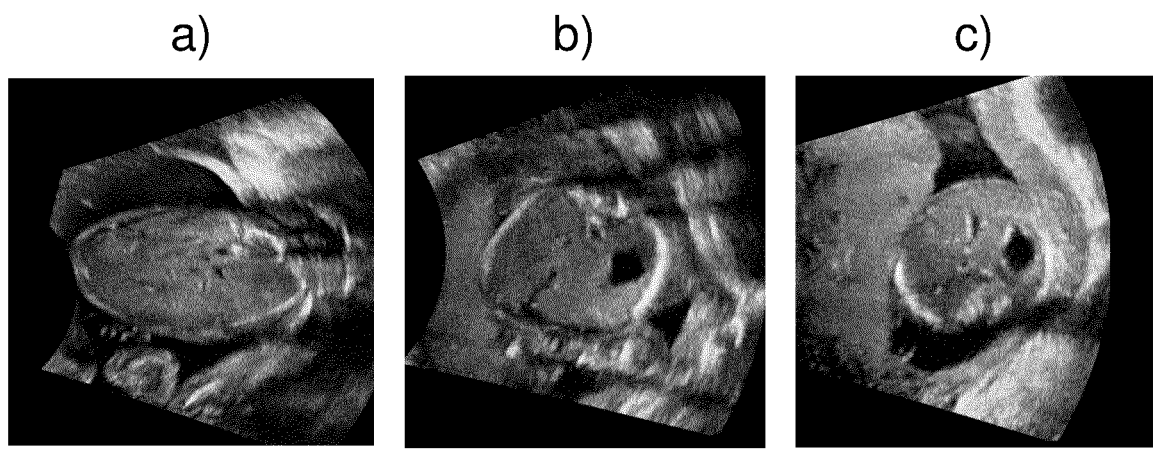
FIG. 11 shows three examples of 2D ultrasound images.

FIG. 11 shows three examples of 2D ultrasound images. Given the global confidence index (derived from the combination of a geometrical indicator and an anatomical indicator), a visualization tool is used to give the user an insight on the quality of an ultrasound plane. For any given plane (image), the associated view may be colored according to this global confidence index 114. The underlying color map may range from green (good anatomical view, suitable for measurement) to red (incorrect view). For example, image a) in FIG. 11 shows an incorrect view and would be colored red. Image b) shows a somewhat incorrect view of the anatomy, however it does show some of the anatomical structures of interest, thus it would be colored yellow. Image c) shows a good anatomical view (suitable for measurement) and thus would be colored green. Note that this functionality can be coupled with an indication on the localization of the view at hand in the 3D volume 102, in order to give general context to the user.

As explained above, the detection of the anatomical indicators and geometric indicators is based on the user of machine learning algorithms.

A machine-learning algorithm is any self-training algorithm that processes input data in order to produce or predict output data. Here, the input data comprises 2D ultrasound images and/or 3D ultrasound volumes and the output data comprises a set of geometric indicators and a set of anatomical indicators.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries correspond to example 2D ultrasound images and/or 3D ultrasound volumes annotated with target anatomical structures and anatomical landmarks. The skilled person would be readily capable of developing a processor for carrying out any herein described method. Thus, each step of a flow chart may represent a different action performed by a processor, and may be performed by a respective module of the processing processor.

The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for determining a global confidence index for each image of a set of two-dimensional, 2D, ultrasound images extracted from a three dimensional, 3D, ultrasound volume, wherein the global confidence index comprises a measure of a suitability of the 2D ultrasound image for biometry measurements, the method comprising:
   training a first neural network to automatically identify 3D anatomical structures inside of a 3D ultrasound volume training dataset;
   obtaining the 3D ultrasound volume of a subject;
   extracting the set of 2D ultrasound images from the 3D ultrasound volume;
   processing the 3D ultrasound volume with the trained first neural network to obtain a set of geometrical indicators, wherein each geometrical indicator indicates geometrical features of anatomical features of the subject;
   processing the set of 2D ultrasound images with a second neural network, wherein an output of the second neural network is a set of anatomical indicators and wherein the anatomical indicators indicate at least a presence of anatomical landmarks;
   determining the global confidence index for each 2D ultrasound image of the set based on the geometrical indicators and the anatomical indicators; and
   displaying one of the set of 2D ultrasound images together with a respective indication of the global confidence index to aid a user in acquiring a target 2D image plane.

2. The method as claimed in claim 1, wherein one of the geometrical indicators is dependent on one or more of the other geometrical indicators in the set of geometrical indicators.

3. The method as claimed in claim 1, further comprising displaying a sub set of 2D ultrasound images and displaying the corresponding global confidence index with each one of the 2D ultrasound images from the sub set of 2D ultrasound images, wherein the sub set of 2D ultrasound images is determined based on:
   the 2D ultrasound images with the highest values of the global confidence index for the 2D ultrasound images in the set; or the 2D ultrasound images with the lowest values of the global confidence index for the 2D ultrasound images in the set; or comparing the corresponding global confidence index of each 2D ultrasound image to a pre-determined value of the global confidence index; or comparing the corresponding global confidence index of each 2D ultrasound image to a user-determined value of the global confidence index.

4. A non-transitory computer readable medium comprising computer program for implementing the method of claim 1 when said program is run on a processing system.

5. The method as claimed in claim 1, wherein the first neural network is a 3D neural network and wherein obtaining the set of geometrical indicators comprises processing the 3D ultrasound volume with the 3D neural network, wherein an output of the 3D neural network is the set of geometrical indicators.

6. The method as claimed in claim 5, wherein the geometrical indicators obtained from the 3D neural network are computed at an interception of 3D anatomical structures with the set of 2D ultrasound images.

7. A method for selecting a 2D ultrasound image during fetal biometry, the method comprising:
determining a global confidence index using the method as claimed in claim 1, wherein the 3D ultrasound volume is a 3D fetal ultrasound volume;
displaying a virtual ultrasound probe, wherein the virtual ultrasound probe is configured to virtually navigate in three dimensions around the 3D ultrasound volume according to a fetal biometry workflow;
selecting a 2D ultrasound image from the set of 2D ultrasound images based on a position of the virtual ultrasound probe with respect to the 3D ultrasound volume and further with a global confidence index corresponding to a highest level of suitability; and
displaying the selected 2D ultrasound image together with a respective indication of the global confidence index to aid a user in acquiring a fetal measurement.

8. The method as claimed in claim 7, further comprising, for the selected 2D ultrasound image with a selected plane:
rotating the virtual ultrasound probe around an axis perpendicular to the selected plane and passing through a center of the the selected plane, and wherein selecting the 2D ultrasound image is further based on the rotation of the virtual ultrasound probe around the perpendicular axis; and
translating the virtual ultrasound probe along an axis parallel to the selected plane and wherein selecting the 2D ultrasound image is further based on the translation of the virtual ultrasound probe along the parallel axis.

9. The method as claimed in claim 8, further comprising:
displaying the selected 2D ultrasound image;
displaying the corresponding global confidence index; and
displaying the virtual ultrasound probe on the 3D ultrasound volume in a position which indicates where a real ultrasound probe would be placed on a real volume to obtain the selected 2D ultrasound image.

10. A system for determining a confidence index for each image of a set of two-dimensional, 2D, ultrasound images extracted from a three dimensional, 3D, ultrasound volume, wherein the global confidence index comprises a measure of a suitability of the 2D ultrasound image for biometry measurements, the system comprising:
an ultrasound probe for obtaining the 3D ultrasound volume of a subject;
a processor configured to:
extract the set of 2D ultrasound images from the 3D ultrasound volume;
process the 3D ultrasound volume with a first neural network to compute a set of geometrical indicators, wherein each geometrical indicator indicates geometrical features of anatomical features of the subject;
process the set of 2D ultrasound images with a second neural network, wherein an output of the second neural network is a set of anatomical indicators and wherein the anatomical indicators indicate at least a presence of anatomical landmarks; and
automatically determine the global confidence index for each 2D ultrasound image of the set based on the geometrical indicators and the anatomical indicators; and
a display configured to display one of the set of 2D ultrasound images together with a respective indication of the global confidence index to aid a user in acquiring a target 2D image plane,
wherein the first neural network is trained to automatically identify 3D anatomical structures inside of a previously obtained 3D ultrasound volume training dataset.

11. A system for selecting a 2D ultrasound image during fetal biometry, comprising:
the system as claimed in claim 10, wherein the 3D ultrasound volume is a 3D fetal ultrasound volume and wherein the processor is further configured to:
select the 2D ultrasound image from the 3D ultrasound volume based on a position of a virtual ultrasound probe with respect to the 3D ultrasound volume and further with a global confidence index corresponding to a highest level of suitability;
and wherein the display is further configured to:
display the virtual ultrasound probe, wherein the virtual ultrasound probe is configured to virtually navigate in three dimensions around the 3D ultrasound volume according to a fetal biometry workflow; and
display the selected 2D ultrasound image and the corresponding global confidence index.

12. The system as claimed in claim 11, wherein the display is further configured to:
display the virtual ultrasound probe on the 3D ultrasound volume in a position which indicates where a real ultrasound probe would be placed on a real volume to obtain the selected 2D ultrasound image.

13. The system as claimed in claim 11, wherein the processor is further configured, for the selected 2D ultrasound image with a selected plane, to:
rotate the virtual ultrasound probe around an axis perpendicular to the selected plane and passing through a center of the selected plane;
translate the virtual ultrasound probe along an axis parallel to the selected plane; and
select another of the 2D ultrasound images further based on the rotation of the virtual ultrasound probe around the perpendicular axis and the translation of the virtual ultrasound probe along the parallel axis.

14. The system as claimed in claim 10, wherein the respective indication of the global confidence index is a color, and further wherein the display is further configured to automatically display the color based on the automatically determined global confidence index of the displayed 2D ultrasound image.

15. The system as claimed in claim 14, wherein the color is one selected from green, yellow, and red based on an anatomical view suitable for measurement, an anatomical view unsuitable for measurement but showing at least some anatomical structures of interest, and an anatomical view unsuitable for measurement respectively.

* * * * *